Sept. 3, 1929.  W. M. CARROLL  1,727,158
UNDERCUTTER
Filed Nov. 19, 1927
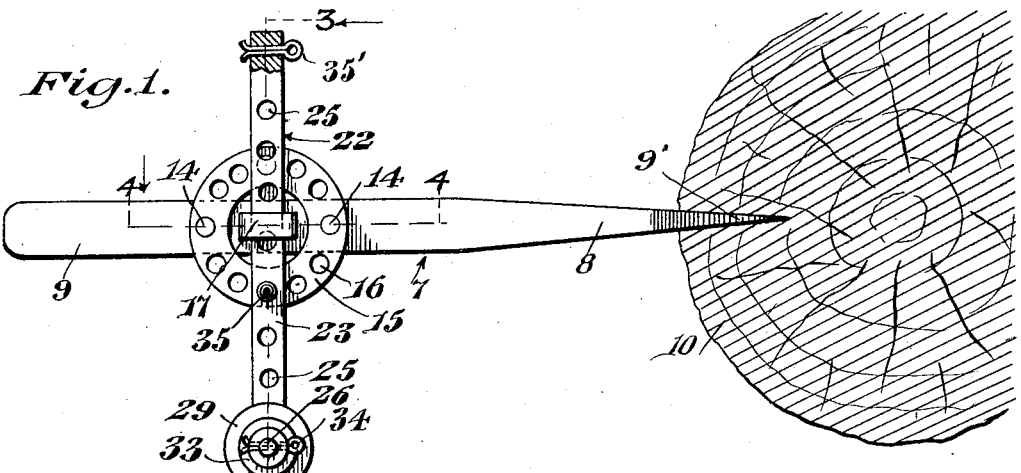
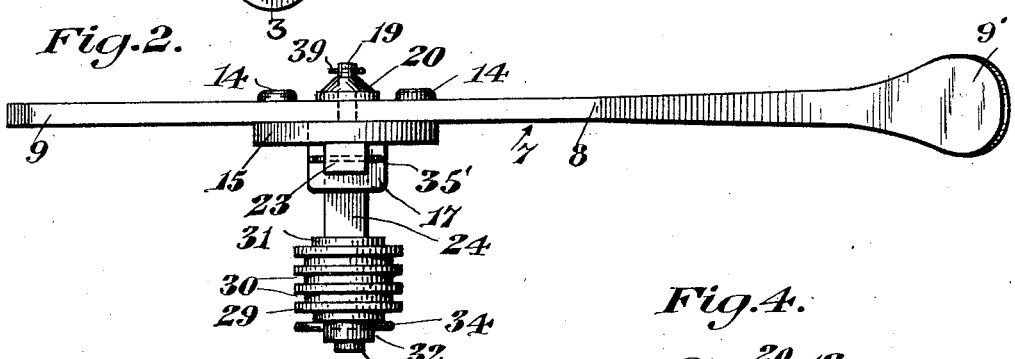
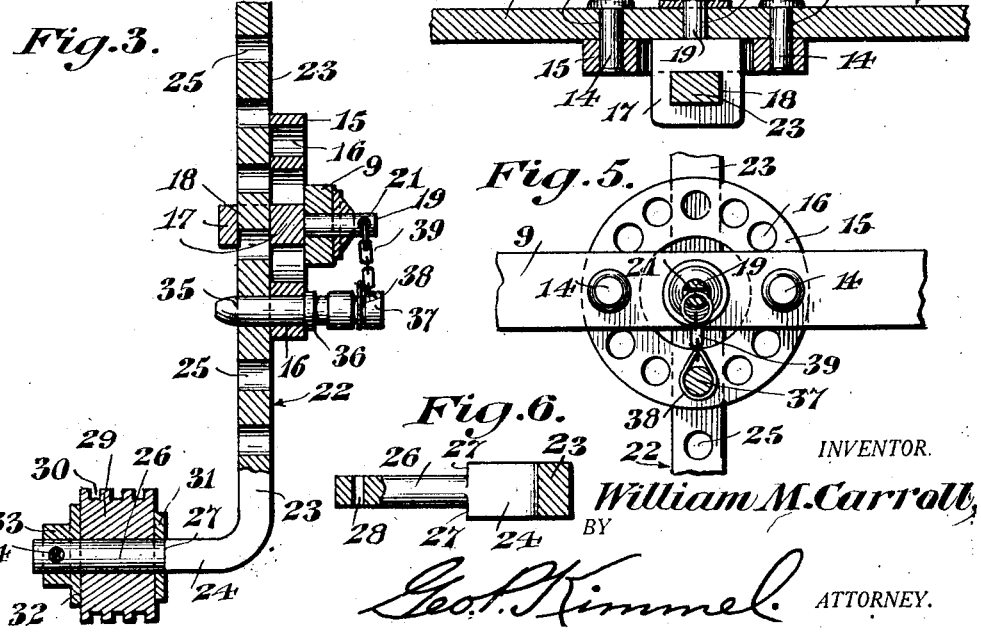
INVENTOR.
William M. Carroll,
BY
Geo. P. Kimmel.
ATTORNEY.

Patented Sept. 3, 1929.

1,727,158

UNITED STATES PATENT OFFICE.

WILLIAM M. CARROLL, OF RYDERWOOD, WASHINGTON.

UNDERCUTTER.

Application filed November 19, 1927. Serial No. 234,488.

This invention relates to an undercutter designed primarily for use in connection with the sawing of logs, when it is required to saw from the underside of the log to cut upwardly, making it necessary to position the saw upside-down, but it is to be understood that an undercutter in accordance with this invention may be employed for any purposes for which it is found applicable, and the invention has for its object to provide, in a manner as hereinafter set forth, a tool of the class referred to for supporting and holding the saw up to the cut during the sawing operation, as well as capable of being conveniently adjusted and efficiently held in adjusted position to provide a non-slip guiding or bearing means for the saw during the reciprocation thereof.

A further object of the invention is to provide, in a manner as hereinafter set forth, a tool of the class referred to with means to efficiently maintain an adjustable saw guide or bearing carrier in set position to overcome the shifting or slipping of the latter by tension applied thereto, during the sawing operation thereby preventing loss of time and a handicap to the buckers.

Further objects of the invention are to provide, in a manner as hereinafter set forth, an undercutter for the purpose referred to which is simple in its construction and arrangement, strong, durable, compact, thoroughly efficient in its use, conveniently adjusted, readily assembled, and comparatively inexpensive to manufacture.

With the foregoing and other objects in view the invention consists of the novel construction, combination and arrangement of parts as hereinafter more specifically described, and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is an elevation of an undercutter, in accordance with this invention, and showing the adaptation thereof with respect to a log.

Figure 2 is a top plan view of the undercutter.

Figure 3 is a section on line 3—3 Figure 1.
Figure 4 is a section on line 4—4 Figure 1.

Figure 5 is a fragmentary view in sectional plan.

Figure 6 is a fragmentary view in section of the slidable carrier.

Referring to the drawings in detail 7 generally indicates a supporting or suspension element and is known as a spike. The element 7 includes a tapered intermediate portion 8, a rectangular end portion 9 and a flaring end portion 9' which is in the form of a chisel. The element 7 is adapted to be driven into the side of a log 10 and projects a substantial distance therefrom at right angles thereto. The element 7 is formed from a bar of metallic material of the desired length and thickness. The flaring end 9' is disposed at right angles with respect to the side faces of the end part 9 and the latter is of materially greater length than the intermediate part 7 or the flaring end part 9'. The end part 9 is formed with a series of openings 11, 12 and 13.

Fixedly secured against one of the side faces of the end part 9, by the holdfast devices 14 is a latching member 15 in the form of a flat annulus provided with a circular row of openings 16. The holdfast devices 14 extend through a pair of openings 16 arranged diametrically opposite and said holdfast devices further extend through the openings 11 and 13. The openings 16 are equally spaced with respect to each other and the number of the openings 16 of the row can be as desired. The holdfast devices 14 are in the form of rivets.

Positioned against that side face of the end part 9, against which the latching member 15 is secured, is a coupling member 17 in the form of a rectangular plate provided with a rectangular opening 18 and further provided with a stem or shank 19 which extends through the opening 12 and carries a retaining means 20 positioned against the other side face of the end portion 9 of the element 7. The stem or shank 19 projects above or from the means 20 and is formed with a diametrically extending opening 21. The coupling member 17 abuts against the end part 9 of the element 7 and rotates within the latching member 14 as well as projects a substantial distance therefrom.

The opening 18, formed in the coupling member 17, provides a guide passage for a slidable carrier, generally indicated at 22. The carrier is bodily carried with the coupling member 17, but it can be shifted in both directions through the coupling member 17 when desired and without shifting said member 17.

The carrier 22 is in the form of an angle shaped bar conforming in contour to the shape of the opening 18 and with one of the arms of the bar indicated at 23 and the other at 24. The arm 23 is of greater length than the arm 24 and the latter is disposed at right angles with respect to one end of the arm 23. The arm 23 is formed with a lengthwise extending row of spaced openings 25. The number of the openings 25 of the row can be as desired and the openings 25 are adapted to selectively register with one of the openings 16 for a purpose to be presently referred to. The arm 23 is of rectangular cross section and a portion of the arm 24 is also rectangular in cross section, but the remaining portion of the arm 24 is cylindrical, as indicated at 26 to provide a shaft. The cylindrical portion 26 of the arm 24 forms a shoulder 27 intermediate the ends of said arm 24. The outer end of the cylindrical portion 26 is provided with a diametrically disposed opening 28. Revolubly mounted on the cylindrical portion 26 of the arm 24 is a guide or bearing member 29 formed with spaced, annular peripheral grooves 30 and each of which is adapted to receive the saw to provide a guide or bearing therefor. When the saw is upside-down, that side edge opposite the toothed edge thereof is selectively mounted in one of the grooves 30. Positioned on the portion 26 of the arm 24 and interposed between the member 33 and the shoulder 27 is a washer 31. Positioned on the portion 26 of the arm 24 and bearing against the member 29 is a washer 32 provided with a hub 33 which is connected to the arm 24 by a cotter pin 34 extending through the hub 33 and the opening 28.

Associated with the latching member 15 is a retaining member 35 in the form of a straight bolt provided intermediate its ends with an annular peripheral flange 36 and also formed with a head 37 provided with an annular groove 38. The retaining member 35 is adapted to extend through a pair of aligning openings 16, 25 to latch the carrier in set position. One of the retaining members 35 extends through a pair of aligning openings 16 and 25 and the flange 36 abuts against the latching member 15. The retaining member 35 is permanently connected to the stem or shank 19 by a flexible coupling 39 which extends through the opening 21 and around the groove 38. The free end of the arm 23 has a stop 35'.

The carrier 22 can be shifted diametrically with respect to the latching member 15 and then revolved around one face of the latter until the desired angular position for the carrier 22 is obtained, after which the carrier is latched in position by the member 35 coacting with the registering openings 16 and 25. The adjusting of the carrier 22 positions the guide or bearing member 29 in a manner to hold the saw up to the cut. The member 29 can be arranged in varying spaced relations with respect to the edge of the latching member 15. The manner of latching the guide or bearing member 29 in adjusted position prevents the shifting or slipping thereof from set position or in other words the strain on the member 30 or tension on said member will not act to bodily shift it from set position, as it will be securely held in set position by the coacting of the retaining member 35 with the latching member 15.

It is thought the many advantages of an undercutter, in accordance with this invention can be readily understood, and although the preferred embodiment of the invention is as illustrated and described, yet it is to be understood that changes in the details of construction can be had which fall within the scope of the invention as claimed.

What I claim is:—

1. An undercutter comprising a spike, an annulus fixedly secured thereto and formed with spaced openings, a rotatable coupling member connected to the spike, extending through and projecting from said annulus, an adjustable saw guide carrier slidably extending through said member and bodily carried therewith when said member is rotated, a saw guide revolubly supported on said carrier at one end of the latter, said carrier formed with openings selectively registering with the openings in the annulus, and means extended through a pair of registering openings for latching the carrier in adjustable position.

2. An undercutter comprising a spike, an annulus fixedly secured thereto and provided with spaced openings, a rotatable coupling member including a shank extending through said spike, means connected to the shank for rotatably securing the coupling member to the spike, said member extending through and projecting from said annulus, an adjustable saw guide carrier slidably extending through said member and bodily carried therewith when said member is rotated, a saw guide revolubly supported on said carrier, said carrier formed with openings selectively registering with the openings in the annulus, means extending through a pair of registering openings for latching the carrier in adjusted position, and means for permanently coupling said latching means to said shank.

In testimony whereof, I affix my signature hereto.

WILLIAM M. CARROLL.